(12) United States Patent
Lange et al.

(10) Patent No.: US 7,710,287 B2
(45) Date of Patent: May 4, 2010

(54) SENSOR SYSTEM FOR MACHINE TOOLS

(75) Inventors: Dirk Lange, Lüneburg (DE); Volker Redecker, Bispingen (DE)

(73) Assignee: Artis Gesellschaft fur Angewandte Messtechnik mbH, Bispingen-Berhringen (DE)

( * ) Notice: Subject to any disclaimer, the term of this patent is extended or adjusted under 35 U.S.C. 154(b) by 295 days.

(21) Appl. No.: 11/773,047

(22) Filed: Jul. 3, 2007

(65) Prior Publication Data
US 2008/0030355 A1 Feb. 7, 2008

(30) Foreign Application Priority Data
Jul. 4, 2006 (DE) .................. 10 2006 030 834

(51) Int. Cl.
*G08B 21/00* (2006.01)
*G06F 19/00* (2006.01)
(52) U.S. Cl. ........................ 340/680; 700/175
(58) Field of Classification Search ............... 340/680; 700/175
See application file for complete search history.

(56) References Cited

U.S. PATENT DOCUMENTS

| | | | |
|---|---|---|---|
| 4,608,763 A * | 9/1986 | Manns et al. | 33/561 |
| 4,761,101 A * | 8/1988 | Zettl | 408/6 |
| 4,779,319 A * | 10/1988 | Juengel | 29/57 |
| 5,150,529 A * | 9/1992 | Collingwood | 33/503 |
| 5,257,199 A * | 10/1993 | Tsujino et al. | 700/160 |
| 6,037,743 A * | 3/2000 | White et al. | 320/103 |
| 7,613,590 B2 * | 11/2009 | Brown | 702/188 |
| 2006/0085092 A1* | 4/2006 | Redecker et al. | 700/175 |

FOREIGN PATENT DOCUMENTS

| | | |
|---|---|---|
| DE | 195 31 625 | 3/1996 |
| DE | 199 26 799 | 12/2000 |
| DE | 10163734 | 6/2005 |
| WO | 01/82447 | 1/2001 |
| WO | 01/82447 | 11/2001 |

OTHER PUBLICATIONS

European Search Report for corresponding application No. EP 07012996 dated Oct. 8, 2007.

\* cited by examiner

*Primary Examiner*—Benjamin C Lee
*Assistant Examiner*—Andrew Bee
(74) *Attorney, Agent, or Firm*—Renner, Otto, Boisselle, & Sklar, LLP

(57) ABSTRACT

A sensor system for a machine tool with at least one sensor with at least one measurement instrument, which measures a physical quantity occurring within the machine tool, which is related to a machining process performed by the machine tool; with a first energy supply for supply of the at least one measurement instrument of the sensor, wherein the first energy supply receives electric energy from a surrounding electromagnetic field in a wireless way; and with a second energy supply for supplying the at least one measurement instrument of the sensor, wherein the second energy supply comprises at least one battery.

13 Claims, 3 Drawing Sheets

SENSOR SYSTEM FOR MACHINE TOOLS

1. TECHNICAL FIELD

Figure 1:
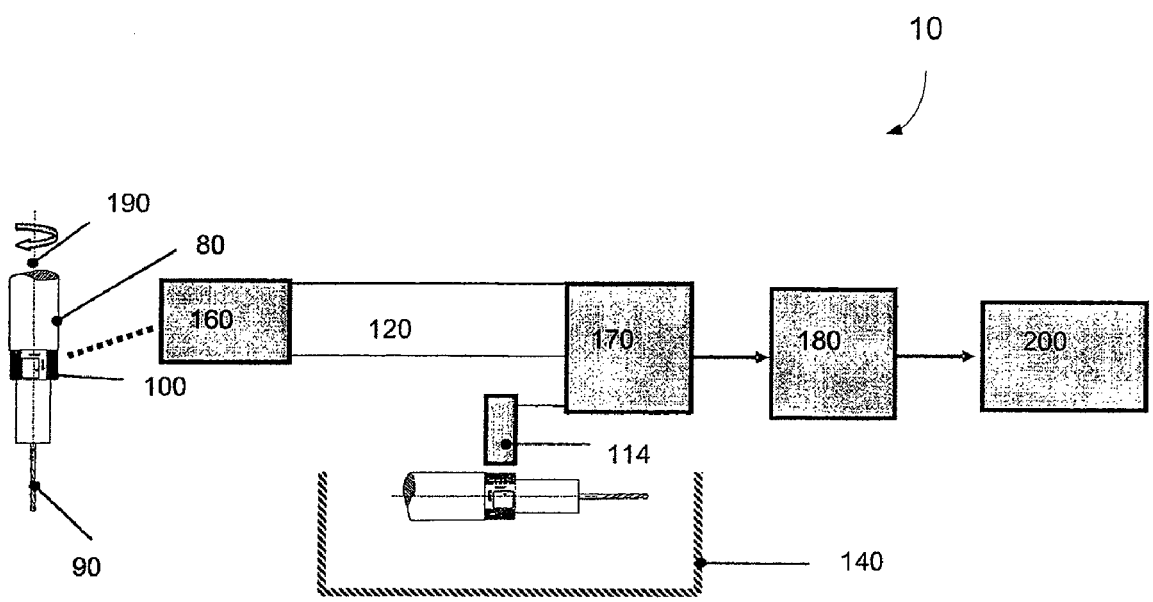

The present invention relates to a sensor system for monitoring machining processes in machine tools

2. RELATED ART

Modern machine tools perform more and more complex machining processes which are controlled by a program. At the same time a machine tool should be increasingly capable to monitor itself and to take appropriate measures in case of an error. For this purpose, the machine tool needs a sensor system which records the relevant physical quantities during the machining process and which can optionally send the data to a controlling unit of the machine tool.

It is important for such sensor systems that the measurement instruments of the sensor system are mounted near the machining tool or the site of action, in order to record the relevant physical quantities of the machining process. In the case of cutting machine tools the measuring instruments should be mounted e.g. on the tool spindle, in order to be able to measure torques by strain gauges or mechanical vibration by piezoelectric sensors.

A problem is posed by the energy supply of the measuring instrument. An energy supply via cable is unsuitable, if the measuring instrument is mounted on a fast moving part of the machine tool like a tool spindle.

The DE 101 63 734 A1 and the DE 199 26 799 A1 both propose a wireless energy supply for measuring instruments which works according to the principle of a transformer. Thereby electric energy is transferred from a primary coil to a secondary coil via an electromagnetic field. A primary coil is installed in the work space of a machine tool, whereas the secondary coil can be moved together with the tool during a machining process.

However, the energy supply systems which are proposed in the above-mentioned documents DE 101 63 734 A1 and DE 199 26 799 A1 have the disadvantages that the monitored tool along with the measurement instrument has to stay always in a region in which there is a sufficiently strong electromagnetic field. If the spindle of the machine tool has a large working range or the electromagnetic field is shielded by the work piece being machined, since e.g. deep drillings are performed, possibly a sufficiently strong external field is not present in the entire work space. In particular, the monitoring of deep borings or millings is especially important, since in this case the risk of damages for the used tools is especially high. If one wants to sufficiently increase the external field strength within the entire working space, in order to compensate for shielding effects, this is very costly, since a multitude of primary coils is needed and the generation of strong fields necessitates the use of large quantities of energy. Further, the installation of one or more primary coils within the work space possibly restricts the mobility of components of the machine tool.

Therefore, the problem of the present invention is to improve the sensor systems for machine tools which are known from the prior art in such a way that one or more measuring instruments can be reliably supplied with energy without high costs, in order to allow for measurements of machining parameters during essentially all machining phases of the machine tool.

3. SUMMARY OF THE INVENTION

This problem is solved by a sensor system for a machine tool with a sensor with at least one measurement instrument, which measures a physical quantity occurring within the machine tool, which is related to a machining process performed by the machine tool; with a first energy supply unit for supply of the at least one measurement instrument of the sensor, wherein the first energy supply unit receives electric energy from a surrounding electromagnetic field in a wireless way; and with a second energy supply unit for supplying the at least one measurement instrument of the sensor, wherein the second energy supply unit comprises at least one battery.

In contrast to the sensor systems of the prior art mentioned above, the provision of two energy supply units according to the present invention allows that the at least one measurement instrument of a sensor also works reliably within work spaces of the machine tool, in which the surrounding electromagnetic field is weak or even non-existent; this is since in these situations the second energy supply unit, which is based on the battery, takes over the energy supply of the measurement instruments of the sensor. Thus the provision of two energy supply units according to the present invention makes possible an essentially continuous and stable measurement operation of the sensor such that also critical situations like deep bore holes or millings can be reliably monitored.

The provision of the first energy supply unit in addition to the second battery-supported supply unit makes sure that the batteries have not to be frequently exchanged or loaded. Since the second energy supply unit is only used in some machining configurations, the lifetime of the battery is considerably increased.

A particularly advantageous embodiment of the invention can be realized, if the battery is provided as a rechargeable accumulator and if the first wireless energy supply unit receives the energy from a surrounding electromagnetic field which loads the rechargeable accumulator. This is a particularly economic way of supplying energy, since costs for the exchanges of the batteries are nearly completely eliminated. However, the usage of non-rechargeable batteries is also contemplated.

Preferably the electromagnetic field which surrounds the sensor is generated by at least one primary coil. Then the first wireless supply of the sensor works according to the transformer principle. If the sensor is not used for a machining process, the sensor can be deposited in a magazine, if appropriate together with a tool. In a preferred embodiment of the invention the surrounding electromagnetic field covers the magazine and loads an accumulator when machining is interrupted. This is a particularly convenient way of loading the accumulators in the non-active state, since the provision of a cable connection is not necessary for loading in the magazine.

A problem for the usage of accumulators is that a deep discharge of the accumulators and a corresponding loss of capacities have to be avoided. Thus in a preferred embodiment of the invention the sensor system comprises a load electronics, which prevents a deep discharge of the accumulators.

In a further preferred embodiment of the invention, the sensor system additionally comprises a transmitter and/or a receiver unit for data transmission. The data transmission can be employed to avoid a deep discharge of the accumulators. Especially preferred if the machining process of the machine tool is interrupted and the surrounding electromagnetic field is not present, the at least one measurement unit of the sensor is switched off and the data transmission is periodically checked with a first time period $t_1$, preferably around every 200 milliseconds. Further the sensor is preferably entirely switched off, if the data transmission has not taken place during a second time period $t_2$ which is greater than the first time period $t_1$. Preferably the sensor is activated again, if it is surrounded by an electro magnetic field again.

In a further preferred embodiment of the invention, the batteries of the sensors are arranged with respect to the axis of rotation of the machine tool such that no unbalance is generated by a rotation round the axis. In an especially preferred embodiment the batteries are arranged in such a way that they have essentially the same distance d from the rotation axis of the machine tool.

Further preferred embodiments of the invention can be found in the other dependent claims.

4. SHORT DESCRIPTION OF THE DRAWINGS

Figure 2:
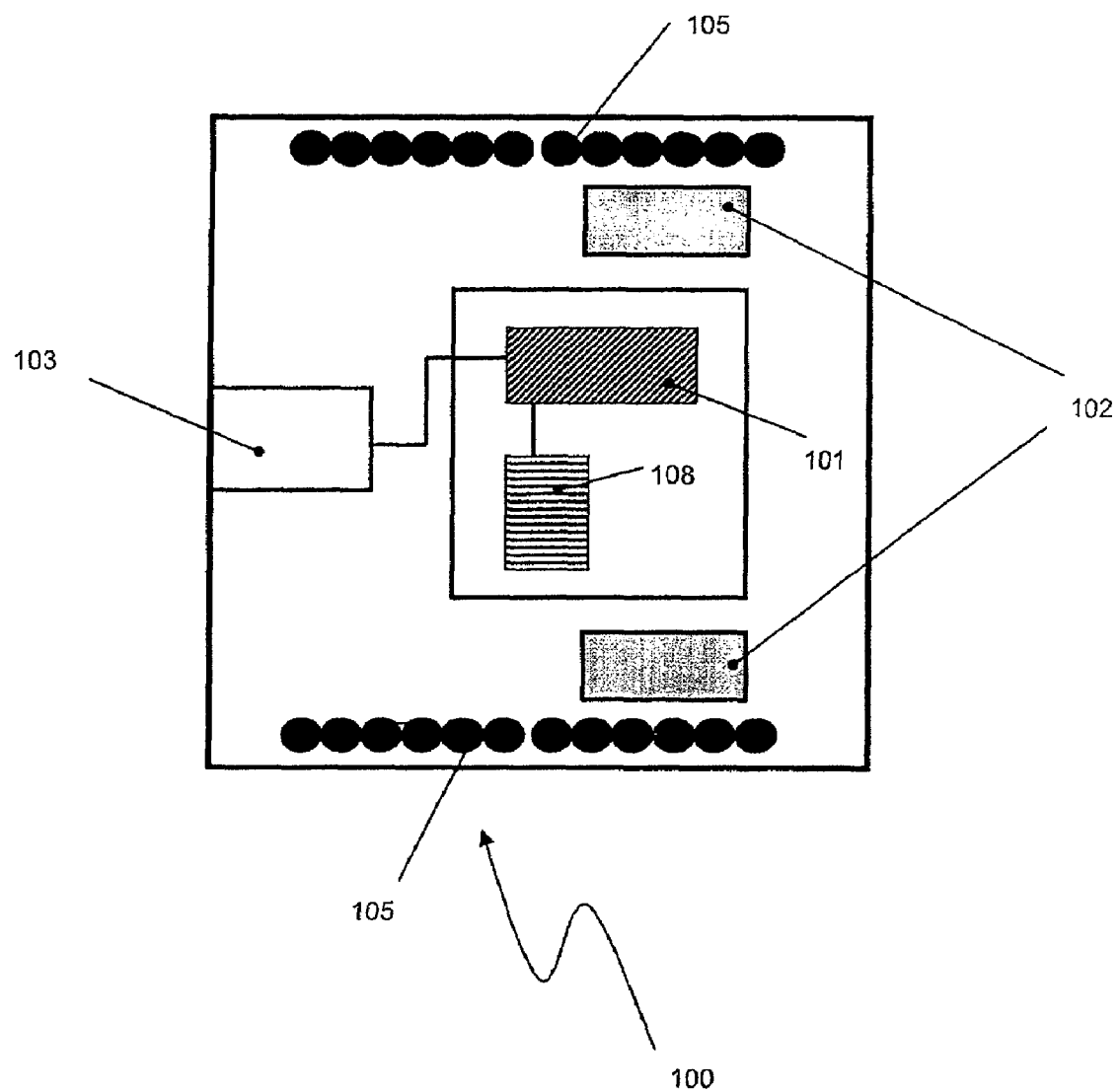
Figure 3:
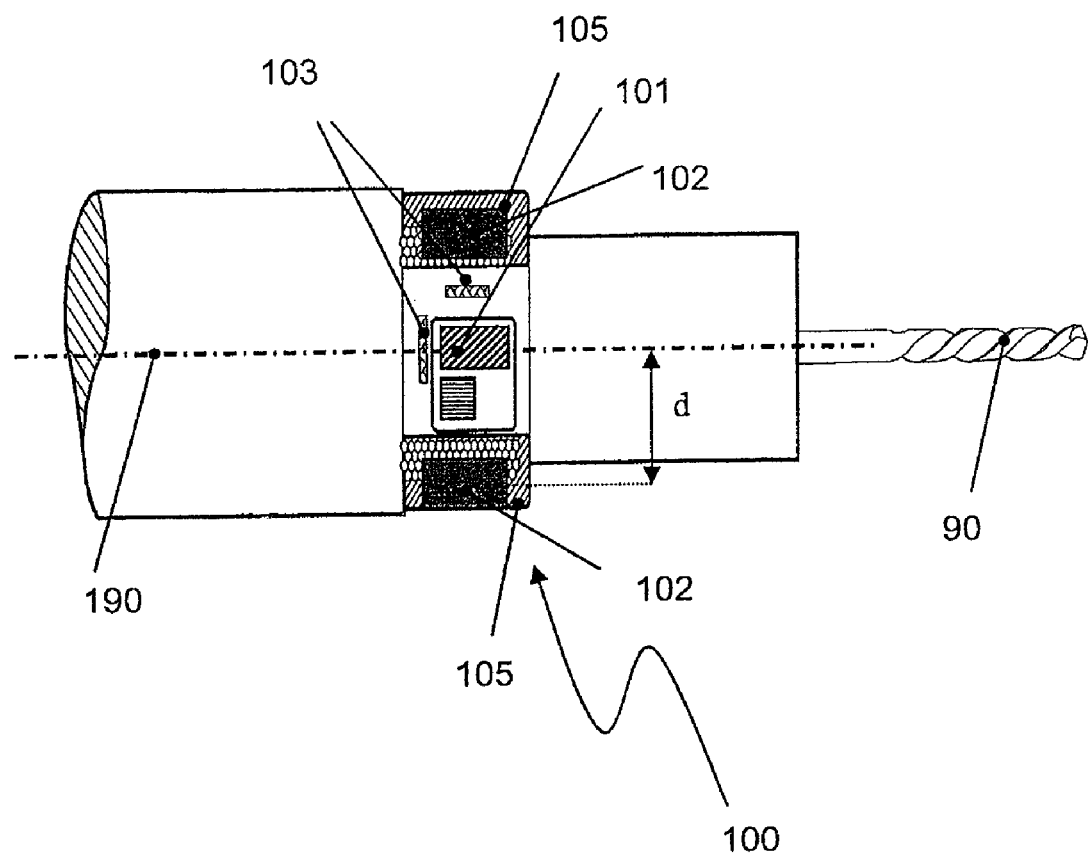

In the following, aspects of the present invention will be outlined referring to the accompanying figures:

FIG. 1: a schematic view of the entire design of an embodiment of the present invention;

FIG. 2: a schematic view of the design of the sensor in a preferred embodiment of the invention; and FIG. 3: a view of an exemplary arrangement of the sensor in FIG. 2 on a tool spindle of a machine tool.

5. DETAILED DESCRIPTION OF PREFERRED EMBODIMENTS OF THE INVENTION

In the following, presently preferred embodiments of the sensor system according to the invention will be described in more detail. Thereby, the sensor system according to the present invention will be described in the context of a cutting machine tool with tool spindle. However, employing the sensor system according to the invention in other machines is equally possible.

A comprehensive view of an embodiment of the invention is shown in FIG. 1. Here, sensor 100 is designed as a measuring chuck which is mounted on the tool spindle in a modular way. The precise construction of sensor 100 will be described further below.

On the left-hand side of FIG. 1, the tool spindle of the machine tool (not shown) with tool holder 80 is displayed in a schematic way. Sensor 100 (the measuring chuck) and tool 90 are fastened to the tool holder 80, wherein all devices can jointly rotate around rotation axis 190 of the tool spindle.

In this embodiment, the sensor system is designed in such a way that the measurement data recorded by sensor 100 can be received by an antenna module 160 which is preferably located in a distance of around 1 m with line of sight to the measuring chuck. Then the measurement data are transferred to a modular electronics 170 via a data bus 120. From this unit, the data are transferred to a monitoring system 180 of the machine tool which is connected to a computer 200 on which the data can be visualized. The measured data, e.g. occurring torques or the used feed force of the machine tool, are preferably transmitted to antenna module 160 with a clock frequency of 10 ms.

The data transmission between sensor 100 and monitoring system 180 is preferably bidirectional. A bidirectional data transmission between a sensor and a monitoring system is described in more detail in DE 10 2004 051 145 A1 of the applicant. The measuring data recorded by sensor 100 are transferred to monitoring system 180 where they are evaluated with the help of computer 200. In this embodiment, antenna module 160 is employed as receiver and as transmitter of data, e.g. for adapting the measurement instruments or the evaluation electronics of sensor 100 which is externally controlled. Accordingly, sensor 100 comprises a transmitting and receiving unit 108 (cf. the schematic detailed view of the sensor in FIG. 2). In an alternative embodiment, the evaluation can be partially or entirely integrated into the sensor itself, for example by an appropriately programmed microchip.

In FIG. 1 below, the sensor is shown during a loading process where it is seen as separated from the tool spindle. Here the sensor is located near stator 114 which is provided as a primary coil. Stator 114 generates an electromagnetic stator field which generates electric energy in a secondary coil 105 of sensor 100 in a wireless way (cf. the schematic detailed view of the sensor in FIG. 2). In this embodiment, the first wireless energy supply unit for supply of sensor 100 corresponds to secondary coil 105 of sensor 100. In a preferred embodiment, the battery of the second energy supply of the sensor system is provided as a rechargeable accumulator, wherein the stator field loads the accumulator(s) via the secondary coil. It is especially practical, if the loading process of the accumulators takes place during those time spans in which the tool with associated sensor 100 is not needed for machining the tool piece and the corresponding tool holder 80 is in a tool magazine 140, as shown schematically in FIG. 1. In addition, in this situation the current load condition of the accumulators can be sent via the data transmission and can be displayed on computer 200.

Alternatively, the surrounding electromagnetic field can also be generated by a stator 114 which can be arranged at another location of the tool machine or which can be generated by a plurality of stators. In particular, the stator field can be provided in such a way that it covers the sensor during the machining process of the machine tool, i.e. stator 114 is mounted near the tool spindle.

FIG. 2 shows the design of sensor 100 schematically. Sensor 100 comprises at least one measurement instrument 103. Measurement instrument 103 measures one physical quantity which occurs in the machine tool and which is related to a machine process that is performed by the machine tool. For example, the measurement instrument can be a piezoelectric sensor for measuring mechanical vibration or an assembly of strain gauges for measuring torques or feed forces. The electric signals of measurement instrument 103 are passed to electronics 101 which can comprise a microprocessor. The amplification of sensor signals can be performed by the electronics. Besides, sensor 100 comprises a transmitting and a receiving unit 108, which are employed for data transmission to a monitoring system, as described above.

According to the invention, there is a first and a second energy supply of sensor 100. As shown in the embodiment of sensor 100 in FIG. 2, the first energy supply comprises a coil 105, which as secondary coil receives energy from the electromagnetic field (stator field) surrounding sensor 100. Both accumulators 102 constitute the second energy supply of the sensor system. Accumulators 102 can now be loaded by the first energy supply unit, i.e. coil 105. Alternatively, ordinary non-rechargeable batteries can be employed as well. In order to load the accumulators, electronics 101 additionally comprises a load electronics (not separately shown in FIG. 2) for accumulators 102. The load electronics measures the load condition of accumulators 102, i.e. by measuring the voltage of the accumulators and calculates the remaining load time of accumulators 102. Further, the load electronics can detect if sensor 100 is located in a sufficiently strong stator field. If accumulators 102 are not fully loaded and sensor 100 is located in a stator field, accumulators 102 are loaded until a fully loaded condition is reached. If the sensor is taken out of the stator field, the loading process is interrupted. If sensor 100 then enters the stator field again, the loading process is continued.

Further, it is important for sensor system 10 to prevent a deep discharge of accumulators 102, i.e. a certain load level of accumulators 102 has to be maintained. Load electronics 101 of the sensor system is designed such that a deep discharge of accumulators 102 is prevented. For this purpose, the calculation of the remaining load time of accumulators 102 can be used, so that counter-acting measures can be taken if a certain load level is undercut. As a consequence, the energy consumption of measurement instrument 103 of sensor 100 is reduced when the machine tool does not perform a machining process and the surrounding stator field is absent. If for example strain gauges are employed, the bridge voltage of the measurement circuit is switched off. Besides, the data transmission is periodically checked with a first time interval $t_1$ which is preferably 200 ms. When no data transmission occurs during a second time period $t_2$, which is greater than the first time period $t_1$, sensor 100 is entirely switched off. If sensor 100, which is in this totally passive condition, again enters a sufficiently strong stator field, sensor 100 is automatically switched on. In this process, the data transmission rate is again set to 10 ms, measurement instrument 103 is switched on, e.g. by activating the bridge voltage for the strain gauge(s) again, and if applicable, a calibration is performed.

FIG. 3 shows a cross section of the tool spindle in a preferred embodiment of the invention. One can see both energy supply systems of the preferred embodiment, namely coil 105 and accumulators 102 of which two are present.

Both accumulators 102 are arranged in such a way that they are facing each other and have an equal distance to rotation axis 190. This guarantees that no unbalance is generated by the accumulators during the rotation of the sensor. In addition, accumulators 102 are encapsulated in so called pockets with soft grouting which allows for an easy exchange of accumulators 102 at a later time. However, an arrangement of ring-shaped accumulators is also conceivable which extend around rotation axis 190 in an essentially cylindrical or belt-shaped arrangement.

The invention claimed is:

1. Sensor system for a machine tool with a sensor comprising
   a. at least one measurement instrument which measures a physical quantity occurring within the machine tool which is related to a machining process performed by the machine tool;
   b. a first energy supply for supply of said at least one measurement instrument of said sensor, wherein said first energy supply produces electric energy from a surrounding electromagnetic field in a wireless way;
   c. a second energy supply for supply of said at least one measurement instrument of said sensor, wherein said second energy supply comprises at least one battery;
   d. a transmitter or receiver for data transmission; and electronics configured such that in the absence of a machining process and when a surrounding electromagnetic field is not present, said electronics switches off said at least one measurement instrument of said sensor system and checks for said data transmission periodically with a first time period t1, and then switches off said sensor entirely, if no data transmission takes place during a second time period t2 which is larger than first time period t1.

2. Sensor system according to claim 1, wherein said battery is provided as a rechargeable accumulator and wherein said first wireless energy supply loads the rechargeable accumulator.

3. Sensor system according to claim 2, wherein the sensor system further comprises a load electronics which prevents a deep discharge of said accumulator.

4. Sensor system according to claim 3, wherein said transmitter or receiver is used for controlling said load electronics.

5. Sensor system according to claim 4, wherein said sensor is activated when the surrounding electromagnetic field is present anew.

6. Sensor system according to claim 1 in combination with a machine tool, wherein said at least one battery of said sensor is arranged with respect to the rotation axis of said machine tool in such a way that essentially no unbalance is generated during a rotation around said rotation axis.

7. The combination according to claim 6, wherein said sensor comprises a plurality of batteries which have essentially the same distance d from said rotation axis of said machine tool.

8. Sensor system according to claim 1, further comprising a primary coil which generates said surrounding electromagnetic field to load the second energy supply while it is disposed in a magazine which is employed for receiving said sensor in the absence of the machining process.

9. Sensor system according to claim 1 in combination with a machine tool, wherein said at least one measurement instrument and said first and said second energy supply are carried by a housing, the housing being moved together with a moving part of said machine tool during the machining process.

10. Sensor system according to claim 1, wherein the first time period is around every 200 milliseconds.

11. Sensor system according to claim 1, comprising both the transmitter and receiver for data transmission.

12. Sensor system according to claim 11, wherein the sensor system further comprises a load electronics which prevents a deep discharge of said accumulator.

13. Sensor system according to claim 12, wherein said transmitter and receiver are used for controlling said load electronics.

* * * * *